US011176176B2

United States Patent
Bordawekar et al.

(10) Patent No.: US 11,176,176 B2
(45) Date of Patent: Nov. 16, 2021

(54) RECORD CORRECTION AND COMPLETION USING DATA SOURCED FROM CONTEXTUALLY SIMILAR RECORDS

(71) Applicant: International Business Machines Corporation, Armonk, NY (US)

(72) Inventors: Rajesh Bordawekar, Westchester, NY (US); Tin Kam Ho, Millburn, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 367 days.

(21) Appl. No.: 16/197,137

(22) Filed: Nov. 20, 2018

(65) Prior Publication Data
US 2020/0159853 A1 May 21, 2020

(51) Int. Cl.
*G06F 16/28* (2019.01)
*G06F 16/22* (2019.01)
*G06F 16/33* (2019.01)
*G06F 40/284* (2020.01)
*G06F 40/279* (2020.01)

(52) U.S. Cl.
CPC .......... *G06F 16/285* (2019.01); *G06F 16/22* (2019.01); *G06F 16/3347* (2019.01); *G06F 40/284* (2020.01)

(58) Field of Classification Search
CPC .... G06F 16/285; G06F 16/22; G06F 16/3347; G06F 16/215; G06F 16/2365; G06F 16/2255; G06F 16/24556; G06F 40/284; G06F 40/279; G06F 40/247
See application file for complete search history.

(56) References Cited

U.S. PATENT DOCUMENTS

| 8,145,677 | B2 | 3/2012 | Al-Shameri | |
| 9,110,941 | B2 * | 8/2015 | Chachra | G06F 16/2365 |
| 10,489,387 | B1 * | 11/2019 | Rogynskyy | G06F 16/29 |

(Continued)

FOREIGN PATENT DOCUMENTS

JP 06149635 A * 5/1994

OTHER PUBLICATIONS

David Lomet; "Data Cleaning: Problems and Current Approaches"; IEEE Computer Society; Dec. 2000 vol. 23 No. 4 (Year: 2000).*

(Continued)

*Primary Examiner* — Dennis Truong
(74) *Attorney, Agent, or Firm* — Garg Law Firm, PLLC; Rakesh Garg; Peter Edwards

(57) ABSTRACT

From a first attribute-value pair in a record, new data comprising a first token is created. From each token using a processor and a memory, new data including a corresponding vector is computed. From the record, a target row is selected, wherein a target attribute-value pair in the target row includes a value requiring correction. Using a similarity measure, a set of most similar rows to the target row is determined, wherein each row in the set of most similar rows to the target row has a corresponding similarity measure above a threshold similarity measure and wherein each row in the set of most similar rows includes the target attribute. From values corresponding to the target attribute in the set of most similar rows, a replacement value is determined. The value requiring correction in the target row is replaced with the replacement value.

20 Claims, 13 Drawing Sheets

(56) References Cited

U.S. PATENT DOCUMENTS

| | | | | |
|---|---|---|---|---|
| 2011/0055252 | A1* | 3/2011 | Kapochunas | G06Q 30/02 707/769 |
| 2011/0270808 | A1* | 11/2011 | Faruquie | G06F 40/247 707/692 |
| 2012/0117036 | A1* | 5/2012 | Lester | G06Q 10/109 707/692 |
| 2012/0226692 | A1* | 9/2012 | Kazi | G06F 16/313 707/737 |
| 2013/0325882 | A1* | 12/2013 | Deshpande | G06F 16/955 707/755 |
| 2014/0222793 | A1* | 8/2014 | Sadkin | G06F 16/24578 707/723 |
| 2014/0379666 | A1* | 12/2014 | Byron | G06F 40/177 707/687 |
| 2016/0004743 | A1* | 1/2016 | Tang | G06F 16/215 707/691 |
| 2017/0011088 | A1* | 1/2017 | Muehlich | G06F 16/215 |
| 2017/0329048 | A1 | 11/2017 | Lemos et al. | |
| 2018/0089762 | A1 | 3/2018 | Lopez de Prado | |
| 2018/0137148 | A1* | 5/2018 | Kabra | G06F 16/215 |
| 2019/0130050 | A1* | 5/2019 | Haas | G06F 16/23 |
| 2019/0236178 | A1* | 8/2019 | Jagota | G06F 16/24575 |
| 2019/0303371 | A1* | 10/2019 | Rowe | G06F 16/24564 |
| 2019/0362452 | A1* | 11/2019 | Brunets | G06Q 10/1091 |

OTHER PUBLICATIONS

Anonymous, "What mechanism can be used to quantify similarity between non=numeric lists", Jun. 16, 2017.

Somasundaram et al., "Evaluation of three simple imputation methods for enhancing preprocessing of data with missing values." International Journal of Computer Applications, vol. 21 21.10 (2011).

Chen et al.,. "Generating weighted fuzzy rules from relational database systems for estimating null values using genetic algorithms." IEEE Transactions on Fuzzy Systems 11.4 (2003): 495-506.

Costa, "Semantic enrichment of knowledge sources supported by domain ontologies." DISS Universidade Nova de Lisboa (2014).

Thiengburanathum, An intelligent destination recommendation system for tourists. Diss. Bournemouth University, 2018.

Chee,. Rectree: A linear collaborative filtering algorithm. DISS, Simon Fraser University, 2000.

Quan Wang et al., Knowledge Base Completion Using Embeddings and Rules, Twenty-Fourth International Joint Conference on Artificial Intelligence (IJCAI 2015).

Dat Quoc Nguyen, An overview of embedding models of entities and relationships for knowledge base completion, Feb. 3, 2018.

\* cited by examiner

*FIGURE 6*

| | 610: RECORDS REQUIRING CORRECTION |
|---|---|
| 620: | 2e92d2e-761e-44ab-a3c34ef86a04300f,MDMPER,60017,99310,M,JOSEPH,ROBERTS,28/8/1992,123 -45-6789,929-555-1212,15 Charles ST, Port Washington,NY,11050,40.754757 -73.601772 ,rubiery,LA,982,CN35U5OUWQ,371230083796510 |
| 622: | 75039e65-4c4e-4502-a6a10d9257e5455e,MDMPER,60017,99311,M,,ROBERTS,28/8/1992,929-5551212,15 Charles ST, Port Washington,NY,11050,40.754757 73.601772 ,rubiery,LA,982,CN35U5OUWQ,371230083796510 |
| 624 | 49a530a9-076c-413e-bb9528403e31506f,MDMPER,60017,99312,M,,ROBERTS,28/8/1992,123-456789,,15 Charles ST, Port Washington,NY,11050,40.754757 73.601772 ,,LA,982,CN35U5OUWQ,371230083796510 |
| 626 | 6c609333-8dec-4c29-9f6a3ae74506ed11,MDMPER,60017,99313,M,JOSEPH,,28/8/1992,123-456789,929-555-1212,15 Charles ST, Port Washington,NY,,41.595236084031704 -73.601772 ,rubiery,LA,982,CN35U5OUWQ,371230083796510 |

FIGURE 7

710: TOKENIZED RECORDS REQUIRING CORRECTION

720  RECORDID_99310 SEX_M FNAME_JOSEPH LNAME_ROBERTS DATE_1992 SSN_123-45-6789 HPHONE_929-555-1212 HSTREET_CHARLES_ST HCITY_PORT_WASHINGTON HSTATE_NY HZIP_11050 DLSTATE_LA

722  RECORDID_99311 SEX_M FNAME_EMPTY LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

724  RECORDID_99312 SEX_M FNAME_EMPTY LNAME_ROBERTS DATE_1992 SSN_123-45-6789 HPHONE_EMPTY HSTREET_CHARLES_ST HCITY_PORT_WASHINGTON HSTATE_NY HZIP_11050 DLSTATE_LA

726  RECORDID_99313 SEX_M FNAME_JOSEPH LNAME_EMPTY DATE_1992 SSN_123-45-6789 HPHONE_929-555-1212 HSTREET_CHALES_ST HCITY_PORT_WASHINGTON HSTATE_NY HZIP_EMPTY DLSTATE_LA

750: EMBEDDED VERSIONS OF TOKENIZED RECORDS REQUIRING CORRECTION

760  RECORDID_99310 -0.070478 -0.100994 -0.143470 0.131677 0.114188 0.313440 -0.414410 ..........-0.094346 0.000799 0.354441 0.151673 - 0.014098 -0.048114 -0.076878

762  RECORDID_99311 -0.053640 0.039358 -0.173150 0.132419 0.108239 0.260488 -0.348273 .................. -0.060692 0.024584 0.160796 - 0.085758 0.297699 0.131804 0.212261

764  RECORDID_99312 -0.054600 -0.048932 -0.101793 0.064376 0.039635 0.187125 -0.397341 .................. -0.023224 0.004482 0.297173 - 0.225032 0.280954 0.105488 0.202494

766  RECORDID_99313 -0.085362 -0.061280 -0.065528 0.247916 -0.058329 0.169836 -0.414207 ................... -0.121763 0.093890 0.403218 - 0.230695 0.079132 0.132205 -0.179551

FIGURE 8

ROW TO BE CORRECTED:

810 — RECORDID_99309 SEX_M (NAME_EMPTY) LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

NEAREST NEIGHBORS OF SUBJECT RECORDID:

820 — RECORDID_99310 SEX_M (NAME_JOSEPH) LNAME_ROBERTS DATE_1992 SSN_123-45-6789 HPHONE_929-555-1212 HSTREET_CHARLES_ST HCITY_PORT_WASHINGTON HSTATE_NY HZIP_11050 DLSTATE_LA

822 — RECORDID_99308 SEX_M (NAME_JOSEPH) LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

824 — RECORDID_99312 SEX_M (NAME_EMPTY) LNAME_ROBERTS DATE_1992 SSN_123-45-6789 HPHONE_EMPTY HSTREET_CHARLES_ST HCITY_PORT_WASHINGTON HSTATE_NY HZIP_11050 DLSTATE_LA

826 — RECORDID_99313 SEX_M (NAME_JOSEPH) LNAME_ROBERTS DATE_EMPTY SSN_123-45-6789 HPHONE_929-555-1212 HSTREET_CHALES_ST HCITY_PORT_WASHINGTON HSTATE_NY HZIP_EMPTY DLSTATE_LA

CORRECTED ROW:

830 — RECORDID_99309 SEX_M (NAME_EMPTY) LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

*FIGURE 9*

ROW TO BE CORRECTED:

910 RECORDID_99309 SEX_M FNAME_EMPTY LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

⇒

NEAREST NEIGHBORS OF SUBJECT RECORDID :

920 RECORDID_99310 SEX_M FNAME_JOSEPH LNAME_ROBERTS DATE_1992 SSN_123-45-6789 HPHONE_929-555-1212 HSTREET_CHARLES_ST HCITY_PORT_WASHINGTON HSTATE_NY HZIP_11050 DLSTATE_LA

922 RECORDID_99308 SEX_M FNAME_JOSEPH LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

924 RECORDID_99312 SEX_M FNAME_EMPTY LNAME_ROBERTS DATE_1992 SSN_123-45-6789 HPHONE_EMPTY HSTREET_CHARLES_ST HCITY_PORT_WASHINGTON HSTATE_NY HZIP_11050 DLSTATE_LA

926 RECORDID_99313 SEX_M FNAME_JOSEPH LNAME_EMPTY DATE_1992 SSN_123-45-6789 HPHONE_929-555-1212 HSTREET_CHALES_ST HCITY_PORT_WASHINGTON HSTATE_NY HZIP_EMPTY DLSTATE_LA

⇒

CORRECTED ROW:

930 RECORDID_99309 SEX_M FNAME_EMPTY LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

*FIGURE 10*

ROW TO BE CORRECTED:

1010 — RECORDID_99309 SEX_M (NAME_EMPTY) LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

NEAREST NEIGHBORS OF SUBJECT RECORDID:

1020 — RECORDID_99310 SEX_M (NAME_JOSEPH) LNAME_ROBERTS DATE_1992 SSN_123-45-6789 HPHONE_929-555-1212 HSTREET_CHARLES_ST HCITY_PORT_WASHINGTON HSTATE_NY HZIP_11050 DLSTATE_LA

1022 — RECORDID_99308 SEX_M (NAME_JOSEPH) LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

1024 — RECORDID_99312 SEX_M (NAME_EMPTY) LNAME_ROBERTS DATE_1992 SSN_123-45-6789 HPHONE_EMPTY HSTREET_CHARLES_ST HCITY_PORT_WASHINGTON HSTATE_NY HZIP_11050 DLSTATE_LA

1026 — RECORDID_99313 SEX_M (NAME_JOSEPH) LNAME_ROBERTS DATE_EMPTY DATE_1992 SSN_123-45-6789 HPHONE_929-555-1212 HSTREET_CHALES_ST HCITY_PORT_WASHINGTON HSTATE_NY HZIP_EMPTY DLSTATE_LA

CORRECTED ROW:

1030 — RECORDID_99309 SEX_M (NAME_EMPTY) LNAME_ROBERTS DATE_1992 SSN_EMPTY HPHONE_929-555-1212 HSTREET_CHARLES_ST HCITY_PORT_WASHINGTON HSTATE_NY HZIP_11050 DLSTATE_LA

US 11,176,176 B2

RECORD CORRECTION AND COMPLETION USING DATA SOURCED FROM CONTEXTUALLY SIMILAR RECORDS

TECHNICAL FIELD

The present invention relates generally to a method, system, and computer program product for record correction for records in a database or other data compendium. More particularly, the present invention relates to a method, system, and computer program product for record correction and completion using data sourced from contextually similar records.

BACKGROUND

The terms "correction" and "completion" and their grammatical variants are contemplated to include each other unless expressly distinguished where used. Any reference to a "correction", "completion", or to a grammatical variant thereof, refers to either a correction of incorrect data, completion of incomplete data, replacement of erroneous data, provision of missing data, a data change to make data more correct or more complete relative to a previous state of the data, or some combination thereof.

A database is an organized collection of data, generally stored and accessed electronically from a computer system. A database management system is software that allows users and applications to interact with data in the database, including entry, storage, retrieval, and organization of that data. The database, database management system, and any associated applications are referred to collectively as a database system.

Many database systems organize data according to a relational model and are referred to as relational database systems. A relational model organizes data into one or more tables, or relations, of columns and rows. Generally, each table represents one entity type (such as customers or products). Rows, also called records or tuples, in a table represent instances of that type of entity (such as a particular customer or particular product). Columns, also called attributes, in a table represent attributes of a particular instance (such as an address or price). Thus, an intersection of a row and a column holds a value attributed to an instance (such as a particular customer's address or the price of a particular product).

In some database systems, each row in each table has its own unique key, called a primary key. Each primary key selects one and only one row in a table, for access and possible modification. By adding a column for the primary key of a linked row into another table, primary keys are used to define relationships among tables. Primary keys are typically system-assigned integers, to enforce uniqueness and allow for efficient data access.

SUMMARY

The illustrative embodiments provide a method, system, and computer program product. An embodiment includes a method that creates new data comprising a first token, from a first attribute-value pair in a record, the record comprising a set of rows, a row in the set of rows comprising a set of values wherein a value in the set of values corresponds to an attribute, the value and the attribute comprising the first attribute-value pair, and the first token comprising a text string corresponding to the first attribute-value pair. An embodiment computes, from each token using a processor and a memory, new data comprising a corresponding vector. An embodiment selects, from the record, a target row, wherein a target attribute-value pair in the target row includes a value requiring correction. An embodiment determines, using a similarity measure, a set of most similar rows to the target row, wherein each row in the set of most similar rows to the target row has a corresponding similarity measure above a threshold similarity measure and wherein each row in the set of most similar rows includes the target attribute. An embodiment determines, from values corresponding to the target attribute in the set of most similar rows, a replacement value. An embodiment replaces, with the replacement value, the value requiring correction in the target row.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts an example of records requiring correction using record correction and completion using data sourced from contextually similar records in accordance with an illustrative embodiment;

FIG. 7 depicts an example of record correction and completion using data sourced from contextually similar records in accordance with an illustrative embodiment;

FIG. 8 depicts a continuation of an example of record correction and completion using data sourced from contextually similar records in accordance with an illustrative embodiment;

FIG. 9 depicts a continuation of another example of record correction and completion using data sourced from contextually similar records in accordance with an illustrative embodiment;

FIG. 10 depicts a continuation of another example of record correction and completion using data sourced from contextually similar records in accordance with an illustrative embodiment;

DETAILED DESCRIPTION

Figure 1:
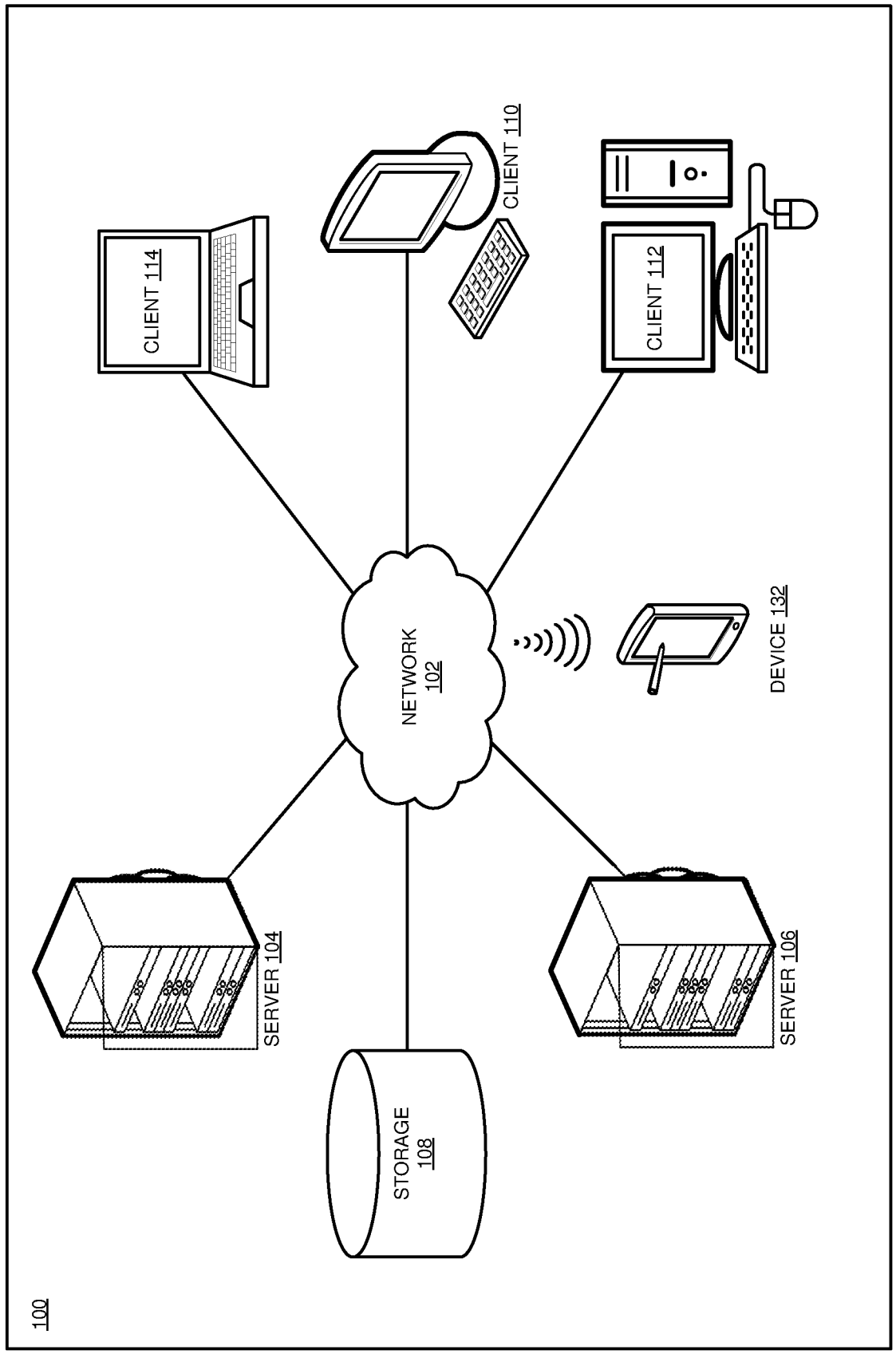
FIG. 1 depicts a block diagram of a network of data processing systems in which illustrative embodiments may be implemented.

Because the data stored in databases and other data records is often assembled over time, from multiple sources, such records often include multiple versions of particular rows of data. Such rows of data may not all be complete, but instead have one or more missing values. As well, not all of the values that are present may be consistent, due to misspellings, typographical errors, and other data entry errors, as well as source data that is incorrect or inconsistent to begin with. For example, during one transaction a customer might supply her formal first name, while during another transaction she might supply her nickname instead. Another customer might sometimes abbreviate her street address, and spell out her street address in full at other times. A third customer might have moved between transactions, resulting in transaction records including two different street addresses.

The illustrative embodiments recognize that there is often a need to correct and complete such records, filling in missing values and resolving inconsistencies between values when possible. The more correct and complete a database is, the more useful the database can be to users.

The illustrative embodiments also recognize that current correction and completion methods are time-consuming, data-dependent, and error prone. For each row that includes a value needing correction or completion, additional rows that might contain a correct value must be identified. If the additional rows contain inconsistent values, one particular version of the value must be chosen to correct the incorrect row. Some inconsistencies are easy to resolve using a rule—for example, always replace an abbreviated form of a word with the corresponding non-abbreviated form of the word. However, other inconsistencies are not—and such rules will often need to be formulated based on the particular attributes to which each rule applies.

The illustrative embodiments also recognize that current correction and completion methods require access to the actual values stored in the database. As a result, correcting or completing encrypted data requires decrypting sufficient data to obtain additional rows that could contain a correct value or supply a missing value, making necessary corrections or completions, and then re-encrypting the resulting data. During this process, unencrypted data could be vulnerable to unauthorized access.

The illustrative embodiments recognize that the presently available tools or solutions do not address these needs or problems, or provide adequate solutions for these needs or problems. The illustrative embodiments used to describe the invention generally address and solve the above-described problems and other problems related to context-based record correction.

An embodiment can be implemented as a software application. The application implementing an embodiment can be configured as a modification of an existing database system, as a separate application that operates in conjunction with an existing database system, a standalone application, or some combination thereof. Particularly, some illustrative embodiments provide a method by which a missing or incorrect data value can be corrected, based on other contextually-similar data in the database.

An embodiment takes as input record data arranged in rows and columns. Alternatively, input record data may be in a different format but rearrangeable into a row-column format. Some rows within the record data may include missing or incorrect values, and some rows within the record data may be complete and correct to varying degrees. The embodiment's goal is to increase the completeness, correctness, or both, of the record data relative to the completeness or correctness of the input record data.

An incomplete row-column intersection is one that requires a value to be supplied in order to be considered a valid record. Conversely, a complete row-column intersection already includes such a value. Depending on the nature of the data, an incomplete row-column intersection may be one that does not have a corresponding value (i.e., the intersection is empty), one that has a corresponding value that is undefined, one that does not have a corresponding non-null value, one that does not have a corresponding non-zero value, or the like. Thus, one measure of completeness of a set of records is the number of row-column intersections in the set of records that are complete divided by the total number of row-column intersections in the set of records. A set of records is considered acceptably complete when the completeness measurement is above a completeness threshold. Such a completeness threshold may vary, depending on the nature of the data in the records. If the nature of the data is such that records are largely complete—for example, the data is collected by an automatic process that only produces incomplete records due to a failure in the data collecting equipment—a high completeness threshold—e.g., 98 percent—might be appropriate to this type of data. If, on the other hand, the nature of the data is such that records are only partially complete—for example, the data consists of responses to opinion poll questions, where those answering the poll questions often decline to answer—a comparatively lower completeness threshold—e.g., 25 percent—might be appropriate to this type of data.

An incorrect row-column intersection is one that has a value that has been determined to be incorrect according to a method associated with the type of data stored in that row-column intersection. For example, a spelling checker application may have determined that a row-column intersection holding text data may have been spelled incorrectly, and is thus incorrect. As another example, a customer may have reported that he has moved and a stored address corresponding to that customer is obsolete. As a result, all row-column intersections containing address data for that customer (including street address, city, state, zip code) are incorrect. Thus, one measure of correctness of a set of records is the number of row-column intersections in the set of records that are correct, i.e. not incorrect, divided by the total number of row-column intersections in the set of records. A set of records is considered acceptably correct when the correctness measurement is above a correctness threshold. Such a correctness threshold may vary, depending on the nature of the data in the records. If the nature of the data is such that records are largely correct—for example, the data is collected by an automatic process that only produces incorrect records due to a failure in the data collecting equipment—a high correctness threshold—e.g., 90 percent—might be appropriate to this type of data. If, on the other hand, the nature of the data is such that records are only partially correct—for example, the data consists of speech-to-text transcriptions which often contain errors—a comparatively lower correctness threshold—e.g., 25 percent—might be appropriate to this type of data.

Columns in a table are also called attributes. Each row-column intersection in a table holds a value. Thus, a row can also be considered to hold a series of attribute-value pairs. One column, or attribute, is assigned to store the primary key of each row. Thus, the primary key of a particular row also has a value and can also be considered an attribute-value pair.

An embodiment converts one or more values in a row, including the value of the primary key of the row, to tokens, each token corresponding to an attribute-value pair. In one exemplary implementation, each token is a text string including an attribute name, separator, and the corresponding value. For example, for an attribute corresponding to the first names of people, with values of "Alice" and "Bob" respectively, corresponding tokens in this exemplary format might be FNAME_Alice and FNAME_Bob. However, other token implementations, including a format other than a text string, other representations of attribute, value, and separator, and other data included in each token, are also contemplated within the scope of the exemplary embodiments.

An embodiment further converts a token in a row to a corresponding vector representation, also known as an embedding. Each embedding is a vector of real numbers, of a selected dimension. As a non-limiting example, one commonly-used dimension is 300, and each real number is between −1 and 1. Each unique token corresponds to a unique vector, and the token-to-vector conversion is configured such that a measure of similarity between two tokens is determined by measuring the similarity between one vector corresponding to one of the tokens and a second vector corresponding to the second token.

One non-limiting method of measuring vector similarity is cosine similarity, which computes similarity between two non-zero vectors by measuring the cosine of the angle between the two vectors. The cosine of 0 degrees is 1, so two vectors with the same orientation—in other words, maximally similar—have a cosine similarity of 1. The cosine of 90 degrees is 0, so two vectors oriented at 90° relative to each other—in other words, maximally dissimilar—have a cosine similarity of 0. Other pairs of vectors having angles between 0 and 90 degrees will have corresponding cosine similarities between 0 and 1. These bounds apply to vectors having any number of dimensions. In particular, cosine similarity can be computed using the expression:

$$\frac{\sum_{i=1}^{n} A_i B_i}{\sqrt{\sum_{i=1}^{n} A_i^2} \sqrt{\sum_{i=1}^{n} B_i^2}}$$

where $A_i$ and $B_i$ are components of vector A and B respectively.

This example of a method for determining similarity is not intended to be limiting. From this disclosure, those of ordinary skill in the art will be able to conceive other ways with which to determine similarity and the same are contemplated within the scope of the illustrative embodiments. For example, similarity between two vectors can also be determined by computing a distance between the two vectors (the difference between two vectors v and w is the length of the difference vector v-w). The vectors with the least distance between each other are the most similar vectors. For example, the Euclidian distance between two vectors v and w is the length of the line segment connecting v and w. The Manhattan distance between two vectors v and w is the sum of the absolute differences of the Cartesian coordinates of each of v and w. Generalizations of both Euclidian and Manhattan distances are also possible, and additional distance or similarity measures are also applicable to measure similarity between vectors.

Once a row has been tokenized and tokens converted to corresponding vector representations, an embodiment selects a row with an attribute having a value requiring correction or completion. The row requiring correction or completion is called the target row, the attribute having a value requiring correction or completion is called the target attribute, the value requiring correction or completion is called the target value, and the token combining the target attribute and target value is called the target token. In one embodiment, the value may be missing, or have been identified as incomplete or incorrect according to a required threshold degree of correctness or completeness by an external process.

An embodiment determines a set of rows that are the most similar rows to the target row. One embodiment determines most similar rows by computing a similarity measure between the primary key token of the target row and the primary key token of each of a set of other rows in the record. The most similar rows are those containing the most similar, as measured by the similarity measure, primary key token to the target row's primary key token. The embodiment determines similarity between tokens by computing a similarity, such as cosine similarity or other similarity determination methods, between corresponding vectors. An embodiment is configurable to choose a particular number of most similar rows, all the rows that have a higher than a threshold value of similarity, or a particular number of most similar rows that also have a higher than a threshold value of similarity. For example, an embodiment might select the ten most similar rows or all the rows having a similarity measure above 0.9 (on a 0-1 scale). Another embodiment might select the ten most similar rows that also have a similarity measure above 0.9. To illustrate, consider a set of ten most similar rows having corresponding similarity measures of 0.94176817, 0.93714607, 0.91738355, 0.9144028, 0.9127276, 0.9088117, 0.8952091, 0.8910568, 0.886788, and 0.88456523. Because the similarity threshold is set to 0.9, only the rows having similarity measures of 0.94176817, 0.93714607, 0.91738355, 0.9144028, 0.9127276, and 0.9088117 are considered the most similar rows.

Once an embodiment has determined a set of most similar rows based on their primary keys in a manner described herein, the embodiment selects a target value for the target attribute. An embodiment constructs a set of values corresponding to the target attribute in the most similar rows. One embodiment selects, as the target value, the most common value that is also not null in the set of values. For example, if the target attribute is customers' first names, and the set of values is (Joe, Joe, Joseph, [null], [null], Joe), the most common non-null value in this set of values is Joe, and Joe would be selected as the target value. Another embodiment selects, as the target value, the centroid, or average, of the values in the set of values, when the values in the set of values are numerical. Other target value selection methods—for example, using the median of a set of numbers—are also possible and contemplated within the scope of the illustrative embodiments. Rows having similar primary keys to the target row are likely to also include attribute values similar to the target value, making these attribute values likely candidates to replace the target value.

Another embodiment determines the most similar rows to the target row by computing a measure of similarity between the target token and the token corresponding to the target attribute of another row in the record. The most similar rows are those containing tokens corresponding to the target attribute that are the most similar, as measured by the similarity measure, to the target token. An embodiment is configurable to choose a particular number of most similar rows, all the rows that have a higher than a threshold value of similarity, or a particular number of most similar rows that also have a higher than a threshold value of similarity. Here too the embodiment determines similarity between tokens by computing a similarity, such as cosine similarity or other similarity determination methods, between corresponding vectors.

Once an embodiment has determined a set of closest rows based on their target attributes in a manner described herein, the embodiment selects a target value for the target attribute. An embodiment constructs a set of values corresponding to the target attribute in the most similar rows. One embodiment selects, as the target value, the most common value that is also not null in the set of values. Another embodiment selects, as the target value, the centroid, or average, of the values in the set of values, when the values in the set of values are numerical. Other target value selection methods are also possible and contemplated within the scope of the illustrative embodiments. Rows with similar target attributes are likely to also include target attribute values that are likely candidates to replace the target value.

Another embodiment determines most similar rows to the target row by generating vector representations of tokenized rows. Vector representations of tokenized rows are generated using any suitable vector representation algorithm, for example using the same mechanism as the token-based vector representation described herein but adapted to convert rows instead of tokens. The embodiment computes a measure of similarity between the vector representation of the target row and vector representations of other rows in the record. In this embodiment, the most similar rows are those that are most similar, as measured by a similarity measure, to the target row. The embodiment determines similarity between rows by computing a similarity, such as cosine similarity or other similarity determination methods, between corresponding vectors. An embodiment is configurable to choose a particular number of most similar rows, all the rows that have a higher than a threshold value of similarity, or a particular number of most similar rows that also have a higher than a threshold value of similarity.

Once the embodiment has determined a set of closest rows based on row similarity in a manner described herein, the embodiment selects a target value for the target attribute. An embodiment constructs a set of values corresponding to the target attribute in the most similar rows. One embodiment selects, as the target value, the most common value that is also not null in the set of values. Another embodiment selects, as the target value, the centroid, or average, of the values in the set of values, when the values in the set of values are numerical. Other target value selection methods are also possible and contemplated within the scope of the illustrative embodiments. Similar rows are likely to also include target attribute values that are likely candidates to replace the target value.

Embodiments compute similarity based on vector representations of tokens or rows, and use data values from similar rows to supply or correct data values in a target row. As a result, the data values used may be either encrypted or unencrypted.

In addition, embodiments are operable on any forms of data records, as long as such data records are first converted into table, row, and attribute form. For example, embodiments are operable on time series data if the time series data is first divided into fixed-length segments and each segment stored in a table.

The manner of record correction and completion using data sourced from contextually similar records described herein is unavailable in the presently available methods in the technological field of endeavor pertaining to data correction technology for data records. A method of an embodiment described herein, when implemented to execute on a device or data processing system, comprises substantial advancement of the functionality of that device or data processing system in finding contextually similar data to data requiring correction, then using the contextually similar data to supply corrections.

The illustrative embodiments are described with respect to certain types of databases, records, tables, rows, attributes, tokens, similarity measures, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
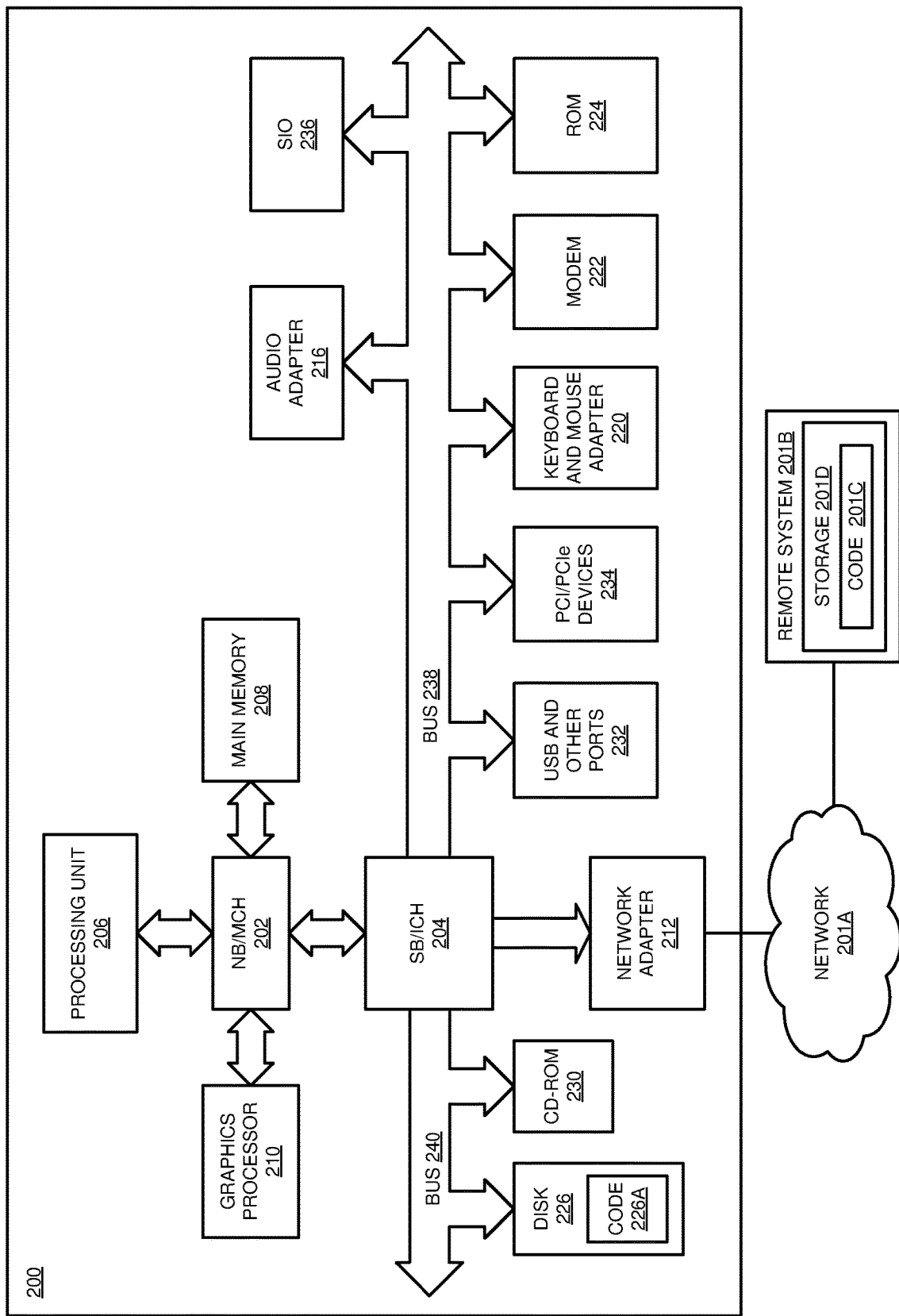
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 operates on data records stored in storage unit 108, or any other suitable location. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
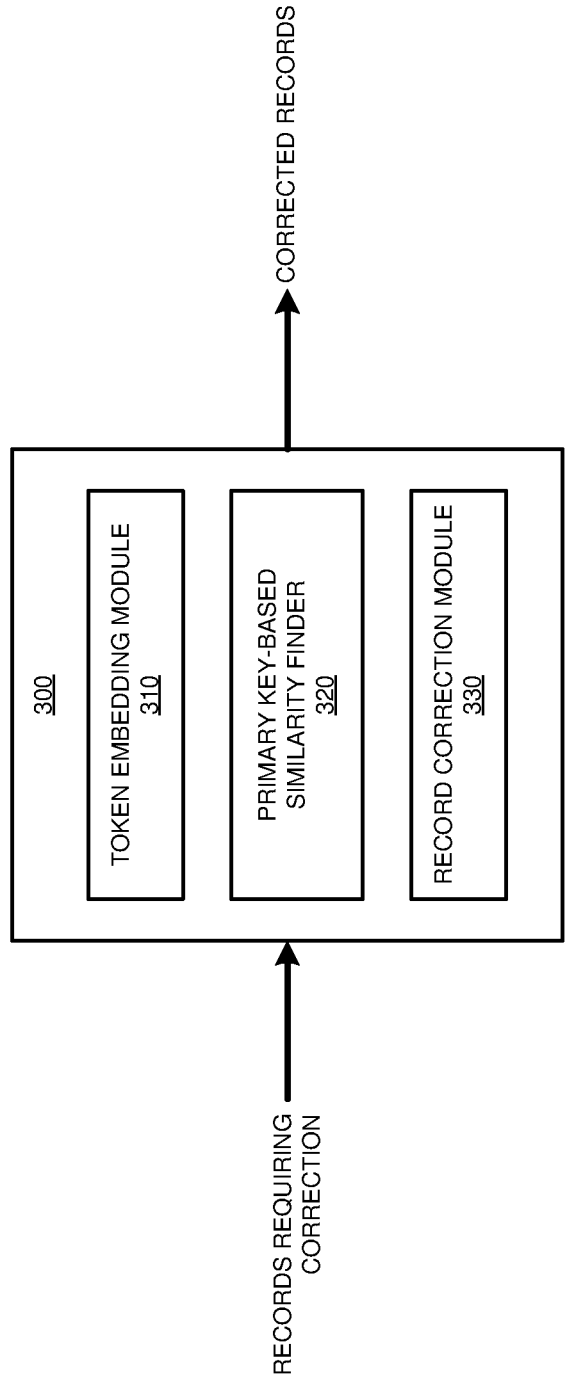
FIG. 3 depicts a block diagram of an example configuration for record correction and completion using data sourced from contextually similar records in accordance with an illustrative embodiment.

With reference to FIG. 3, this figure depicts a block diagram of an example configuration for record correction and completion using data sourced from contextually similar records in accordance with an illustrative embodiment. Application 300 is an example of application 105 in FIG. 1 and executes in any of servers 104 and 106 and clients 110, 112, and 114 in FIG. 1.

Application 300 takes as input record data arranged in rows and columns, or record data that can be rearranged into a row-column format. Some rows within the record data may include missing or incorrect values, and some rows within the record data may be complete and correct. Application 300 attempts to complete and correct as much of the record data as possible based on the data that is available.

Token embedding module 310 converts one or more values in a row, including the value of primary key of the row, to tokens, each token corresponding to an attribute-value pair. One token format can be a text string including an attribute name, separator, and the corresponding value. For example, for an attribute corresponding to the first names of people, with values of "Alice" and "Bob" respectively, corresponding tokens in this format might be FNAME_Alice and FNAME_Bob.

Token embedding module 310 further converts a token in a row to a corresponding vector representation, or embedding. Each embedding is a vector of real numbers, of a selected dimension—for example, 300. Each unique token corresponds to a unique vector, and the token-to-vector conversion is configured such that a measure of similarity between two tokens is determined by measuring the similarity between one vector corresponding to one of the tokens and a second vector corresponding to the second token.

Once a row has been tokenized and tokens converted to corresponding vector representations, primary key-based similarity finder module 320 selects a row with an attribute having a value requiring correction or completion. The value may be missing, or have been identified as incomplete or incorrect according to a required threshold degree of correctness or completeness by an external process. Module 320 determines a set of rows that are the most similar rows to the target row, by computing the cosine similarity between the primary key token of the target row and the primary key token of each of a set of other rows in the record. The most similar rows are those containing the most similar, as measured by cosine similarity or another measure of similarity, primary key token to the target row's primary key token. Module 320 is configurable to choose a particular number of most similar rows, all the rows that have a higher than a threshold value of similarity, or a particular number of most similar rows that also have a higher than a threshold value of similarity.

Once module 320 has determined a set of most similar rows based on their primary keys, record correction module 330 selects a target value for the target attribute. In particular, module 330 constructs a set of values corresponding to the target attribute in the most similar rows, then chooses the most common value that is also not null in the set of values. If the target value is categorical, module 330 uses the most common non-null value of the target attribute in the most similar rows as the new target value. If the target value is a numerical cluster, module 330 uses the centroid of the numerical cluster associated with most common non-null value of the target attribute in the most similar rows as the new target value. Thus, application 300 takes as input data records requiring correction and outputs corresponding corrected records.

Figure 4:
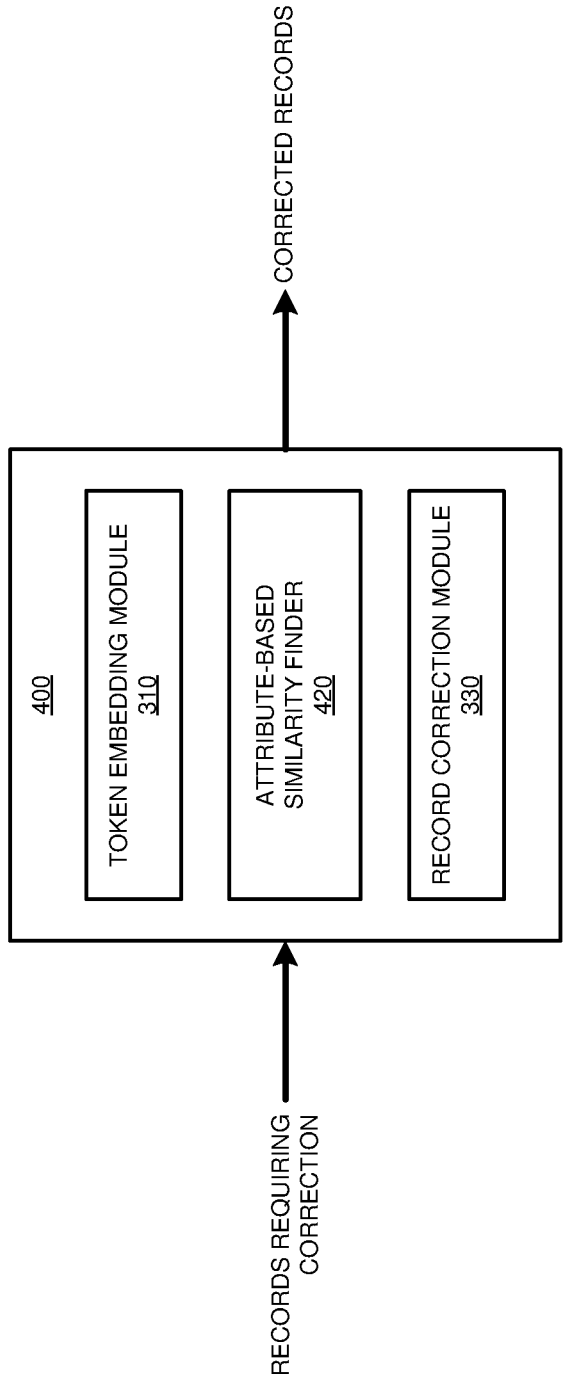
FIG. 4 depicts a block diagram of another example configuration for record correction and completion using data sourced from contextually similar records in accordance with an illustrative embodiment.

With reference to FIG. 4, this figure depicts a block diagram of another example configuration for record correction and completion using data sourced from contextually similar records in accordance with an illustrative embodiment. Application 400 is an example of application 105 in FIG. 1 and executes in any of servers 104 and 106 and clients 110, 112, and 114 in FIG. 1. As well, token embedding module 310 and record correction module 330 are the same as token embedding module 310 and record correction module 330 in FIG. 3.

Application 400 takes as input record data arranged in rows and columns or data that may be rearranged into a row-column format. Some rows within the record data may include missing or incorrect values, and some rows within the record data may be complete and correct. Application 400 attempts to complete and correct as much of the record data as possible based on the data that is available.

Once module 310 has tokenized a row and converted tokens to corresponding vector representations, attribute-based similarity finder module 420 selects a row with an attribute having a value requiring correction. Module 420 determines the most similar rows to the target row, by computing the cosine similarity or another measure of similarity between the target token of the target row and the token corresponding to the target attribute of another row in the record. The most similar, or closest rows are those containing tokens corresponding to the target attribute that are closest, or most similar, to the target token. Module 420 is configurable to choose a particular number of closest rows, all the rows that are closer than a threshold value of closeness, or a particular number of closest rows that are also closer than a threshold value of closeness.

Once module 420 has determined a set of closest rows based on their target attributes, record correction module 330 selects a target value for the target attribute and corrects the target attribute based on the target value, as described herein.

Figure 5:
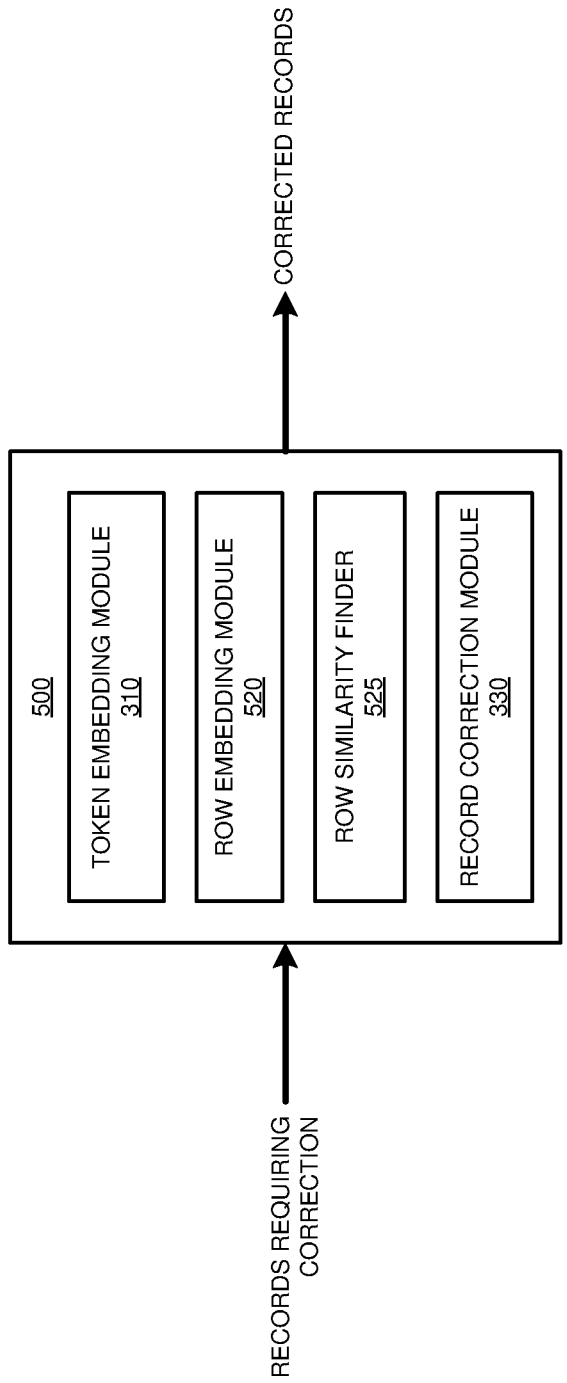
FIG. 5 depicts a block diagram of another example configuration for record correction and completion using data sourced from contextually similar records in accordance with an illustrative embodiment.

With reference to FIG. 5, this figure depicts a block diagram of another example configuration for record correction and completion using data sourced from contextually similar records in accordance with an illustrative embodiment. Application 500 is an example of application 105 in FIG. 1 and executes in any of servers 104 and 106 and clients 110, 112, and 114 in FIG. 1. As well, token embedding module 310 and record correction module 330 are the same as token embedding module 310 and record correction module 330 in FIG. 3.

Application 500 takes as input record data arranged in rows and columns or another format that may be rearranged into a row-column format. Some rows within the record data may include missing or incorrect values, and some rows within the record data may be complete and correct. Application 500 attempts to complete and correct as much of the record data as possible based on the data that is available.

Once module 310 has tokenized a row and converted tokens to corresponding vector representations, row embedding module 520 generates vector representations of tokenized rows, using the same vector generation mechanism as used by token embedding module 310. However, module 310 is adapted to convert individual tokens, while module 520 is adapted to convert entire rows to a corresponding vector representation.

Row similarity finder 525 selects a target row and computes a measure of similarity between the vector representation of the target row and vector representations of other rows in the record. Module 525 determines a set of rows that are the most similar to the target row by computing the cosine similarity or another measure of similarity between corresponding vectors representing the rows. Module 525 is configurable to choose a particular number of most similar rows, all the rows that have a higher than a threshold value of similarity, or a particular number of most similar rows that also have a higher than a threshold value of similarity.

Once module 525 has determined a set of most similar rows, record correction module 330 selects a target value for the target attribute, as described herein.

With reference to FIG. 6, this figure depicts an example of records requiring correction using record correction and completion using data sourced from contextually similar records in accordance with an illustrative embodiment. The records depicted may be inputs to application 300, application 400, and application 500 in FIGS. 3, 4, and 5 respectively.

In particular, set 610 includes rows 620, 622, 624, and 626, in comma-separated variable (CSV) format. Each row is an example of personal data for an employee, including values corresponding to attributes describing the record ID (the primary key in this example database), gender, first name, last name, employee identification number, telephone number, street address, city, state, and zip code (bold portions of each row). (Note that data depicted here is meant only as exemplary data and does not represent personally identifiable information of any particular person.) Row 622 has an empty value corresponding to the first name attribute. Row 624 has an empty value corresponding to the employee identification number attribute. Row 626 has a misspelling in the street address field.

With reference to FIG. 7, this figure depicts an example of record correction and completion using data sourced from contextually similar records in accordance with an illustrative embodiment. The records depicted are being processed by application 300, application 400, and application 500 in FIGS. 3, 4, and 5 respectively.

In particular, set 710 includes rows 720, 722, 724, and 726. Rows 720, 722, 724, and 726 are tokenized versions of rows 620, 622, 624, and 626 in FIG. 6, respectively, in CSV format. Each token is a text string consisting of the attribute, a separator character (here, "_"), and the value of the attribute. For example, in row 720 the token corresponding to the (attribute, value) pair (first name, "JOSEPH") is FNAME_JOSEPH. If an attribute has a missing value, the corresponding token is denoted as EMPTY—for example, FNAME_EMPTY in row 722, corresponding to the empty value corresponding to the first name attribute in row 622.

Set 750 includes vectors 760, 762, 764, and 766. Vectors 760, 762, 764, and 766 are vector representations of the RECORDID_token of rows 720, 722, 724, and 726, respectively. Each vector includes a series of real numbers between −1 and 1, with each real number corresponding to a dimension of the vector.

With reference to FIG. 8, this figure depicts a continuation of an example of record correction and completion using data sourced from contextually similar records in accordance with an illustrative embodiment. The records depicted are being processed by application 300 in FIG. 3.

Row 810 is a tokenized version of a row requiring correction. Row 810 has a missing value of the first name attribute, as depicted by the circled FNAME_EMPTY token. Row 810 also has a primary key, as depicted by the RECORDID_99309 token in bold.

Rows 820, 822, 824, and 826 are tokenized versions of the rows application 300 has determined to be the most similar rows to row 810, based on the primary key token of each row. Application 300 determines that the most common non-null value for the first name attribute is JOSEPH, and replaces the missing value of the first name attribute of row 810 with JOSEPH. The result is depicted in the circled portion of row 830.

With reference to FIG. 9, this figure depicts a continuation of another example of record correction and completion using data sourced from contextually similar records in accordance with an illustrative embodiment. The records depicted are being processed by application 400 in FIG. 4.

Row 910 is a tokenized version of a row requiring correction. Row 910 has a missing value of the first name attribute, as depicted by the circled FNAME_EMPTY token.

Rows 920, 922, 924, and 926 are tokenized versions of the rows application 400 has determined to be the most similar rows to row 810, based on the attribute token of each row. Application 400 determines that the most common non-null value for the first name attribute is JOSEPH, and replaces the missing value of the first name attribute of row 910 with JOSEPH. The result is depicted in the circled portion of row 930.

With reference to FIG. 10, this figure depicts a continuation of another example of record correction and completion using data sourced from contextually similar records in accordance with an illustrative embodiment. The records depicted are being processed by application 500, in FIG. 5.

Row 1010 is a tokenized version of a row requiring correction. Row 1010 has a missing value of the first name attribute, as depicted by the circled FNAME_EMPTY token.

Rows 1020, 1022, 1024, and 1026 are tokenized versions of the rows application 500 has determined to be the most similar rows to row 1010, based on the cosine similarity or another similarity measure of vector representations of each row to row 1010. Application 500 determines that the most common non-null value for the first name attribute is JOSEPH, and replaces the missing value of the first name attribute of row 1010 with JOSEPH. The result is depicted in the circled portion of row 1030.

Figure 11:
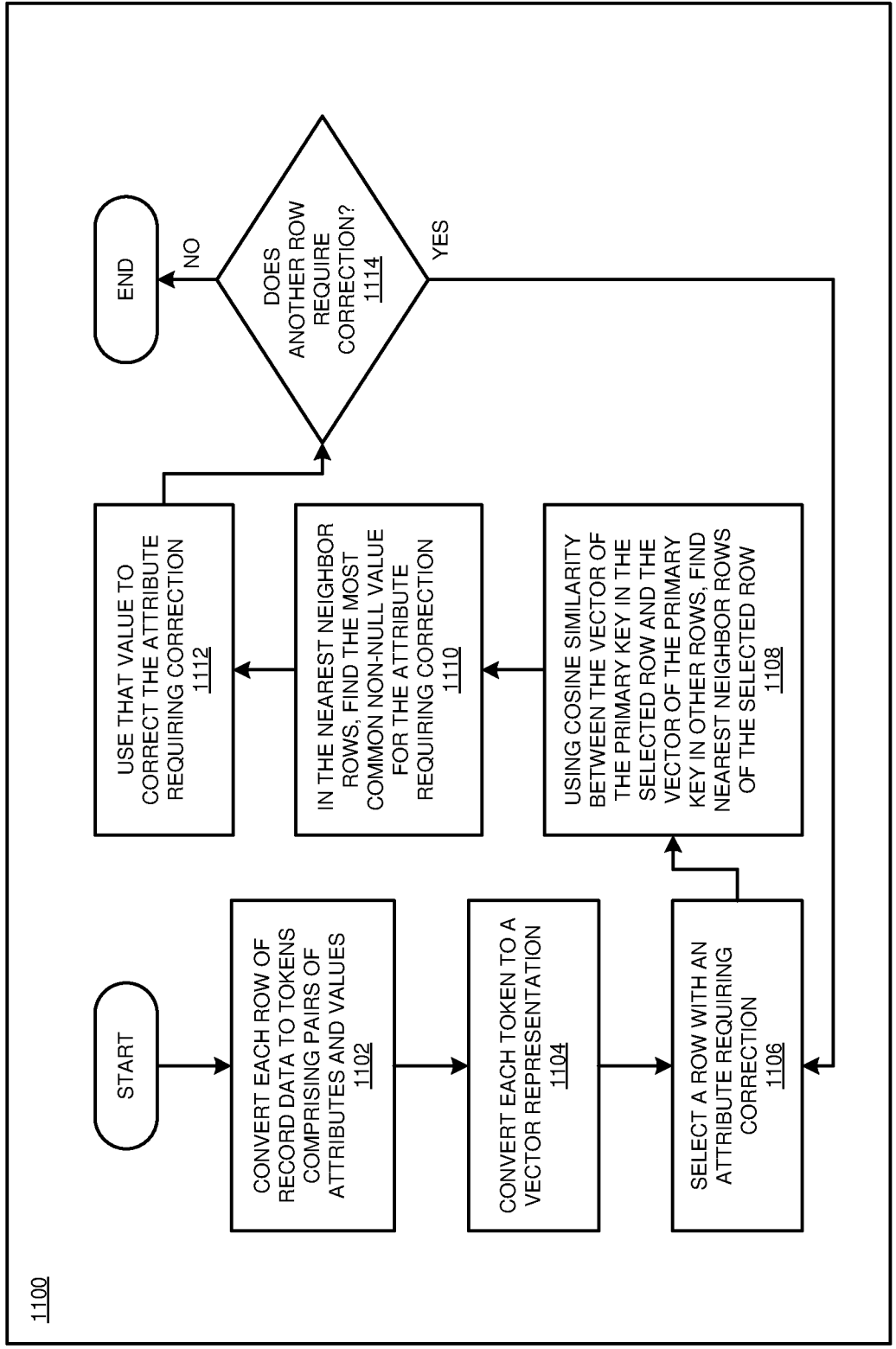
FIG. 11 depicts a flowchart of an example process for record correction and completion using data sourced from contextually similar records in accordance with an illustrative embodiment.

With reference to FIG. 11, this figure depicts a flowchart of an example process for record correction and completion using data sourced from contextually similar records in accordance with an illustrative embodiment. Process 1100 can be implemented in application 300 in FIG. 3.

In block 1102, the application converts rows of record data to corresponding rows of tokenized data, with each token comprising an attribute and corresponding value. In block 1104, the application converts tokens to a corresponding vector representations. In block 1106, the application selects a target row, i.e. a row with an attribute requiring correction or completion. In block 1108, the application uses the cosine similarity or another similarity measure between the vector corresponding to the target primary key token in the target row and the vector corresponding to the primary key token in other rows to find closest rows of the target row. In block 1110, the application finds the most common non-null value for the target attribute in the closest rows. In block 1112, the application uses that value to correct the target attribute. In block 1114, the application checks whether another row requires correction. If so ("YES" path of block 1114), the application returns to block 1106 to process another target row. Otherwise, ("NO" path of block 1114), the application ends.

Figure 12:
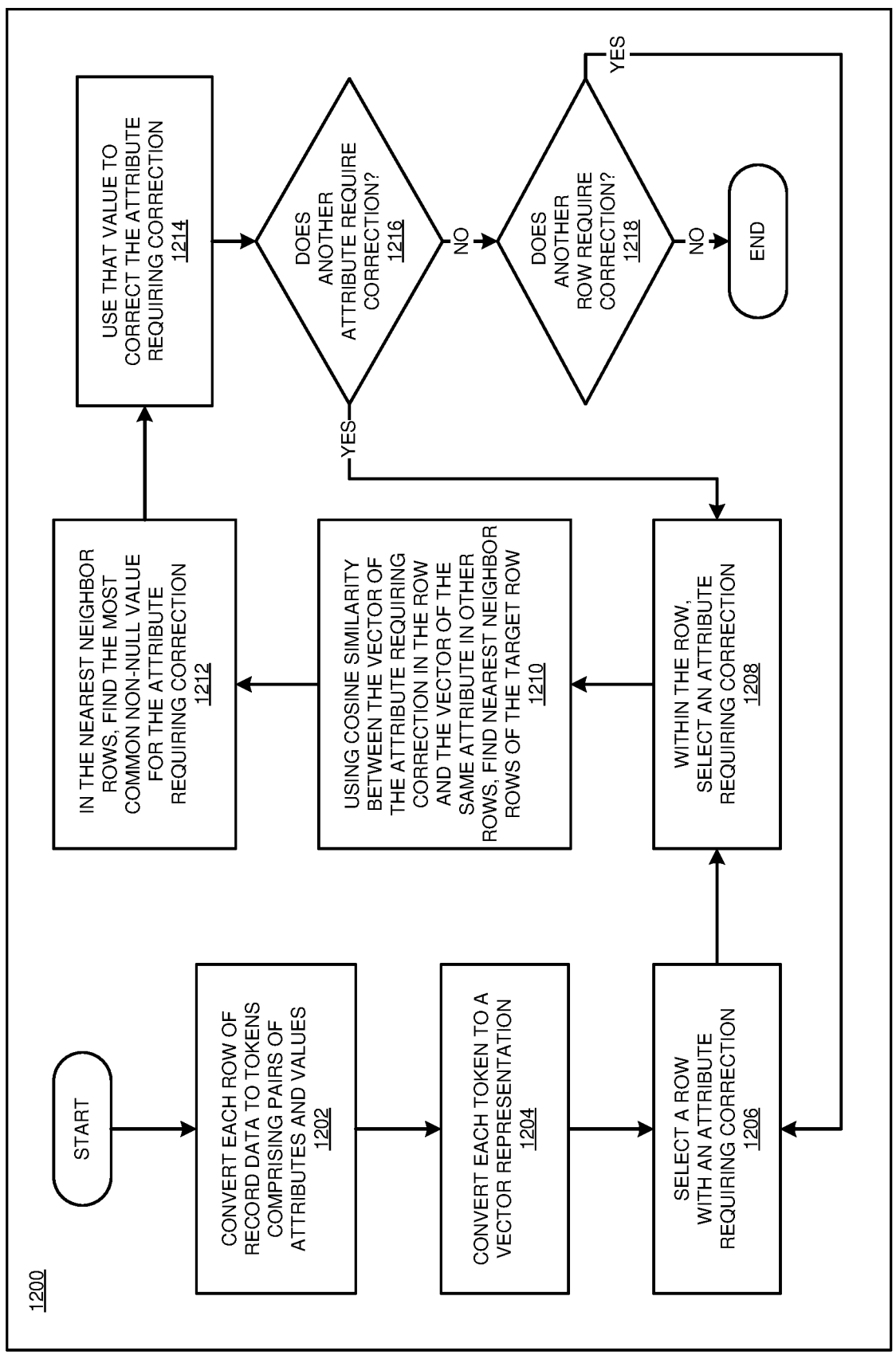
FIG. 12 depicts a flowchart of an example process for record correction and completion using data sourced from contextually similar records in accordance with an illustrative embodiment.

With reference to FIG. 12, this figure depicts a flowchart of an example process for record correction and completion using data sourced from contextually similar records in accordance with an illustrative embodiment. Process 1200 can be implemented in application 400 in FIG. 4.

In block 1202, the application converts rows of record data to corresponding rows of tokenized data, with each token comprising an attribute and corresponding value. In block 1204, the application converts tokens to corresponding vector representations. In block 1206, the application selects a target row, i.e. a row with an attribute requiring correction or completion. In block 1208, the application selects a target attribute in the target row. In block 1210, the application uses the cosine similarity or another similarity measure between the vector corresponding to the target attribute token in the target row and the vector corresponding to the attribute token in other rows to find most similar rows of the target row. In block 1212, the application finds the most common non-null value for the target attribute in the most similar rows. In block 1214, the application uses that value to correct the target attribute. In block 1216, the application checks whether another attribute in the target row requires correction. If so ("YES" path of block 1216), the application returns to block 1208 to process another target attribute. Otherwise, ("NO" path of block 1216), in block 1218 the application checks whether another row requires correction. If so ("YES" path of block 1218), the application returns to block 1206 to process another target row. Otherwise, ("NO" path of block 1218), the application ends.

Figure 13:
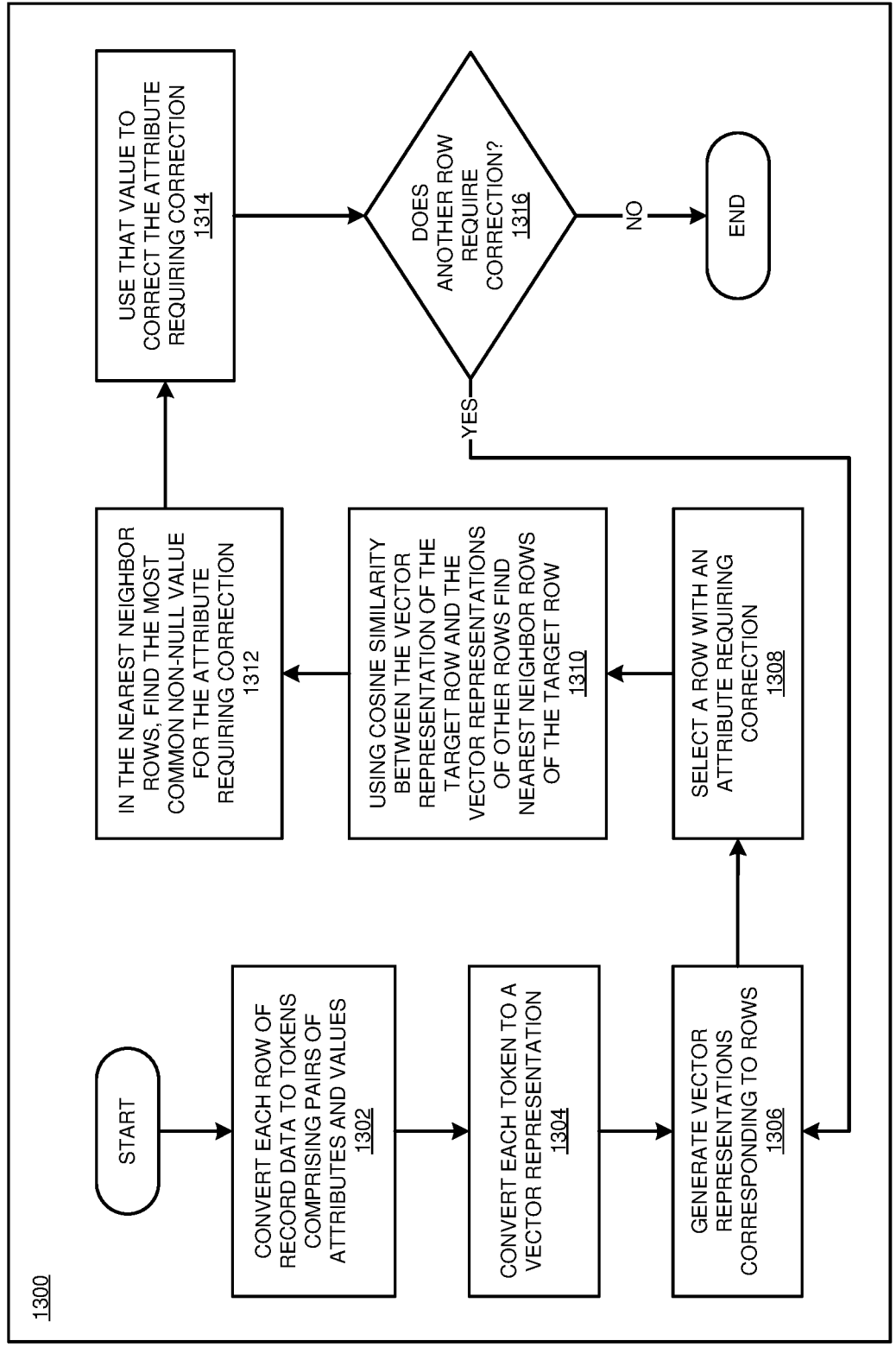
FIG. 13 depicts a flowchart of an example process for record correction and completion using data sourced from contextually similar records in accordance with an illustrative embodiment.

With reference to FIG. 13, this figure depicts a flowchart of an example process for record correction and completion using data sourced from contextually similar records in accordance with an illustrative embodiment. Process 1300 can be implemented in application 500 in FIG. 5.

In block 1302, the application converts rows of record data to corresponding rows of tokenized data, with each token comprising an attribute and corresponding value. In block 1304, the application converts tokens to corresponding vector representations. In block 1306, the application generates summarizing vectors, i.e. vector representations corresponding to rows. In block 1308, the application selects a target row, i.e. a row with an attribute requiring correction or completion. In block 1310, the application uses the cosine similarity or another similarity measure between the vector representation of the target row and the vector representations of other rows to find most similar rows of the target row. In block 1312, the application finds the most common non-null value for the target attribute in the most similar rows. In block 1314, the application uses that value to correct the target attribute. In block 1316, the application checks whether another row requires correction. If so ("YES" path of block 1316), the application returns to block 1106 to process another target row. Otherwise, ("NO" path of block 1316), the application ends.

Thus, a computer implemented method, system or apparatus, and computer program product are provided in the illustrative embodiments for record correction and completion using data sourced from contextually similar records and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
creating a set of tokens, each token in the set of tokens created from an attribute-value pair in a record, the record comprising a set of rows, a row in the set of rows comprising a set of values wherein a value in the set of values corresponds to an attribute, the attribute-value pair comprising the value and the attribute, and each token comprising a text string incorporating the attribute and the value;
computing, from each token using a processor and a memory, a corresponding vector, wherein the corresponding vector comprises a numerical representation of each token, the numerical representation comprising a predetermined number of real numbers;
selecting, from the record, a target row, wherein a target attribute-value pair in the target row includes a value requiring correction;
determining, using a similarity measure between a first vector corresponding to the target row and a set of vectors corresponding to rows other than the target row in the set of rows, a set of most similar rows to the target row, wherein each row in the set of most similar rows to the target row has a corresponding similarity measure above a threshold similarity measure and wherein each row in the set of most similar rows includes the target attribute;
determining, from values corresponding to the target attribute in the set of most similar rows, a replacement value; and
replacing, with the replacement value, the value requiring correction in the target row.

2. The method of claim 1, wherein the record comprises a first row, wherein the first row has a degree of correctness that is less than a preset threshold degree of correctness.

3. The method of claim 1, wherein the record comprises a first row, wherein the first row has a degree of completeness that is less than a preset threshold degree of completeness.

4. The method of claim 1, wherein the set of most similar rows to the target row comprises a predetermined number of rows having the highest similarity measure.

5. The method of claim 1, wherein the predetermined number of real numbers are each between −1 and 1.

6. The method of claim 1, wherein determining a set of most similar rows to the target row comprises:
computing a first degree of similarity between a target primary key vector comprising a first numerical representation of a target primary key token in the target row and a second primary key vector comprising a second numerical representation of a second primary key token in a second row in the record, the target and the second primary key tokens having an attribute acting as a primary key;
adding, to a set of similarities corresponding to rows in the record, the first degree of similarity; and
selecting, from the set of similarities, the set of most similar rows, each row in the set of most similar rows having a corresponding degree of similarity within a tolerance of a specified degree of similarity.

7. The method of claim 6, wherein the first degree of similarity comprises a cosine similarity, the cosine similarity comprising a cosine of an angle between two vectors.

8. The method of claim 1, wherein determining a set of most similar rows to the target row comprises:
computing a first degree of similarity between a target vector comprising a first numerical representation of a target token in the target row and a second vector comprising a second numerical representation of a second token in a second row in the record, the target and the second tokens having the target attribute;
adding, to a set of similarities corresponding to rows in the record, the first degree of similarity; and selecting, from the set of similarities, the set of most similar rows, each row in the set of most similar rows having a corresponding degree of similarity within a tolerance of a specified degree of similarity.

9. The method of claim 8, wherein the first degree of similarity comprises a cosine similarity, the cosine similarity comprising a cosine of an angle between two vectors.

10. The method of claim 1, wherein determining a set of most similar rows to the target row comprises:
computing a first degree of similarity between a target vector comprising a first numerical representation of the target row and a second vector comprising a second numerical representation of a second row in the record;
adding, to a set of similarities corresponding to rows in the record, the first degree of similarity; and
selecting, from the set of similarities, the set of most similar rows, each row in the set of nearest rows having a corresponding degree of similarity within a tolerance of a specified degree of similarity.

11. The method of claim 10, wherein the first degree of similarity comprises a cosine similarity, the cosine similarity comprising a cosine of an angle between two vectors.

12. The method of claim 1, wherein determining a replacement value comprises selecting, as the replacement value, the most common non-null value in a set of values corresponding to the target attribute in the set of most similar rows.

13. The method of claim 1, wherein determining a replacement value comprises selecting, as the replacement value, the centroid value in a set of values corresponding to the target attribute in the set of most similar rows, wherein the values in the set of values are numerical.

14. A computer usable program product comprising one or more computer-readable storage devices, and program instructions stored on at least one of the one or more storage devices, the stored program instructions comprising:
program instructions to create a set of tokens, each token in the set of tokens created from an attribute-value pair in a record, the record comprising a set of rows, a row in the set of rows comprising a set of values wherein a value in the set of values corresponds to an attribute, the attribute-value pair comprising the value and the attribute, and each token comprising a text string incorporating the attribute and the value;
program instructions to compute, from each token using a processor and a memory, a corresponding vector, wherein the corresponding vector comprises a numerical representation of each token, the numerical representation comprising a predetermined number of real numbers;
program instructions to select, from the record, a target row, wherein a target attribute-value pair in the target row includes a value requiring correction;
program instructions to determine, using a similarity measure between a first vector corresponding to the target row and a set of vectors corresponding to rows other than the target row in the set of rows, a set of most similar rows to the target row, wherein each row in the set of most similar rows to the target row has a corresponding similarity measure above a threshold similarity measure and wherein each row in the set of most similar rows includes the target attribute;
program instructions to determine, from values corresponding to the target attribute in the set of most similar rows, a replacement value; and
program instructions to replace, with the replacement value, the value requiring correction in the target row.

15. The computer usable program product of claim 14, wherein the record comprises a first row, wherein the first row has a degree of correctness that is less than a preset threshold degree of correctness.

16. The computer usable program product of claim 14, wherein the record comprises a first row, wherein the first row has a degree of completeness that is less than a preset threshold degree of completeness.

17. The computer usable program product of claim 14, wherein the computer usable code is stored in a computer readable storage device in a data processing system, and wherein the computer usable code is transferred over a network from a remote data processing system.

18. The computer usable program product of claim 14, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to create a set of tokens, each token in the set of tokens created from an attribute-value pair in a record, the record comprising a set of rows, a row in the set of rows comprising a set of values wherein a value in the set of values corresponds to an attribute, the attribute-value pair comprising the value and the attribute, and each token comprising a text string incorporating the attribute and the value;
program instructions to compute, from each token using a processor and a memory, a corresponding vector, wherein the corresponding vector comprises a numerical representation of each token, the numerical representation comprising a predetermined number of real numbers;
program instructions to select, from the record, a target row, wherein a target attribute-value pair in the target row includes a value requiring correction;
program instructions to determine, using a similarity measure between a first vector corresponding to the target row and a set of vectors corresponding to rows other than the target row in the set of rows, a set of most similar rows to the target row, wherein each row in the set of most similar rows to the target row has a corresponding similarity measure above a threshold similarity measure and wherein each row in the set of most similar rows includes the target attribute;
program instructions to determine, from values corresponding to the target attribute in the set of most similar rows, a replacement value; and
program instructions to replace, with the replacement value, the value requiring correction in the target row.

20. The method of claim 1, wherein the set of values is encrypted.

* * * * *